US011210272B2

(12) United States Patent
Zhang et al.

(10) Patent No.: US 11,210,272 B2
(45) Date of Patent: Dec. 28, 2021

(54) LOW LATENCY CACHE SYNCHRONIZATION IN DISTRIBUTED DATABASES

(71) Applicant: Electronic Arts Inc., Redwood City, CA (US)

(72) Inventors: Xinfeng Zhang, Shanghai (CN);
Mengxin Ye, Redwood City, CA (US);
Zhifeng Chen, Freemont, CA (US);
Xiaokai Wu, Shanghai (CN)

(73) Assignee: Electronic Arts Inc., Redwood City, CA (US)

( * ) Notice: Subject to any disclaimer, the term of this patent is extended or adjusted under 35 U.S.C. 154(b) by 207 days.

(21) Appl. No.: 16/394,402

(22) Filed: Apr. 25, 2019

(65) Prior Publication Data
US 2020/0311038 A1 Oct. 1, 2020

Related U.S. Application Data

(63) Continuation of application No. PCT/CN2019/080361, filed on Mar. 29, 2019.

(51) Int. Cl.
*G06F 16/18* (2019.01)
*G06F 16/23* (2019.01)
*G06F 16/182* (2019.01)
*G06F 12/0891* (2016.01)
*G06F 16/17* (2019.01)

(52) U.S. Cl.
CPC ...... *G06F 16/1865* (2019.01); *G06F 12/0891* (2013.01); *G06F 16/1734* (2019.01); *G06F 16/182* (2019.01); *G06F 16/2358* (2019.01)

(58) Field of Classification Search
None
See application file for complete search history.

(56) References Cited

U.S. PATENT DOCUMENTS

| 2010/0082547 A1* | 4/2010 | Mace | G06F 11/1471 |
| | | | 707/648 |
| 2013/0085988 A1* | 4/2013 | Hiraguchi | G06F 16/2365 |
| | | | 707/609 |

(Continued)

*Primary Examiner* — Kim T Nguyen
(74) *Attorney, Agent, or Firm* — Lowenstein Sandler LLP

(57) ABSTRACT

An example distributed database includes a first instance and a second instance. The first instance is configured to: responsive to performing, within a scope of a database update transaction, a first database update operation, invalidate a cache entry residing in the first database cache maintained by the first instance, wherein the first database update operation is reflected by a transaction log maintained by the first instance; perform, within the scope of the database update transaction, a second database update operation to insert an identifier of the cache entry into a predetermined table of the distributed database, wherein the second database update operation is reflected by the transaction log; and responsive to committing the database update transaction, transmit the transaction log to the second instance. The second instance is configured responsive to receiving the transaction log, to: perform the first database update operation specified by the transaction log; and invalidate the cache entry in the second database cache maintained by the second instance.

17 Claims, 9 Drawing Sheets

(56) References Cited

U.S. PATENT DOCUMENTS

| | | | |
|---|---|---|---|
| 2014/0156618 A1* | 6/2014 | Castellano | G06F 16/2358 |
| | | | 707/703 |
| 2014/0195492 A1* | 7/2014 | Wilding | G06F 16/215 |
| | | | 707/684 |
| 2015/0278282 A1* | 10/2015 | Sardina | G06F 16/2343 |
| | | | 707/704 |
| 2018/0150496 A1* | 5/2018 | Kim | G06F 16/2386 |
| 2020/0073763 A1* | 3/2020 | Saini | G06F 16/2365 |
| 2020/0311038 A1* | 10/2020 | Zhang | G06F 16/1865 |

* cited by examiner

| Shard 1 | Key-1, Key-2, Key-3 |
|---------|---------------------|
| Shard 2 | Key-4, Key-5 |
| Shard N | Key-m, Key-n |

Fig. 6

LOW LATENCY CACHE SYNCHRONIZATION IN DISTRIBUTED DATABASES

RELATED APPLICATIONS

This application is a continuation of PCT Application No. PCT/CN2019/080361 filed on Mar. 29, 2019, entitled "Low Latency Cache Synchronization in Distributed Databases," the entire content of which is incorporated by reference herein.

TECHNICAL FIELD

The present disclosure is generally related to distributed databases, and is more specifically related to cache synchronization in distributed databases.

BACKGROUND

Contents of a distributed database may reside on a plurality of storage nodes located in multiple datacenters which may be geographically distant from each other. In various illustrative examples, distributed databases may be employed by various applications, such as online gaming applications, e-commerce applications, or business applications.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 6 schematically illustrates an example memory data structure which may be employed by the systems and methods described herein for storing cache entry identifiers;

DETAILED DESCRIPTION

Described herein are methods and systems for low latency cache synchronization in distributed databases.

A distributed database may reside in multiple datacenters, such that each datacenter may host multiple storage nodes storing the database contents and a local database cache. In an illustrative example, the distributed database may employ the cache aside strategy, according to which the data is loaded to the cache on demand: if a data item requested by an application is not found in the cache, it is retrieved from the data store and stored in the cache. If the data item is subsequently updated by the application, it is then stored in the data store, and the corresponding cache entry is invalidated. In the distributed scenario, each datacenter maintains its own local database cache, and thus the cache coherence strategy should further implement cache synchronization, such that a cache entry invalidation caused by a database access operation performed in one datacenter would be propagated to other datacenters which may store this cache entry. In order to prevent the possibility of stale data being read from the cache, the cache update latency (i.e., the time elapsed between the data update operation and the cache been fully synchronized) should be minimized.

In accordance with one or more aspects of the present disclosure, cache synchronization may involve performing, within the scope of a database update transaction which includes one or more database update operations, an additional (referred to as "auxiliary" herein) update operation to insert identifiers of the invalidated cache entries into a predetermined database table that is specifically employed for storing identifiers of invalidated cache entries. These database update operations would be reflected by the transaction log, which, upon committing the transaction locally, may be transmitted to the remote datacenters which host instances of the distributed database. Upon receiving the transaction log, each remote database instance may locally replay the database update operations and may further invalidate the cache entries whose identifiers are specified by the local transaction log entries reflecting insertion of identifiers of the invalidated cache entries into the predetermined database table, thus synchronizing its cache, as described in more detail herein below.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

Figure 1:
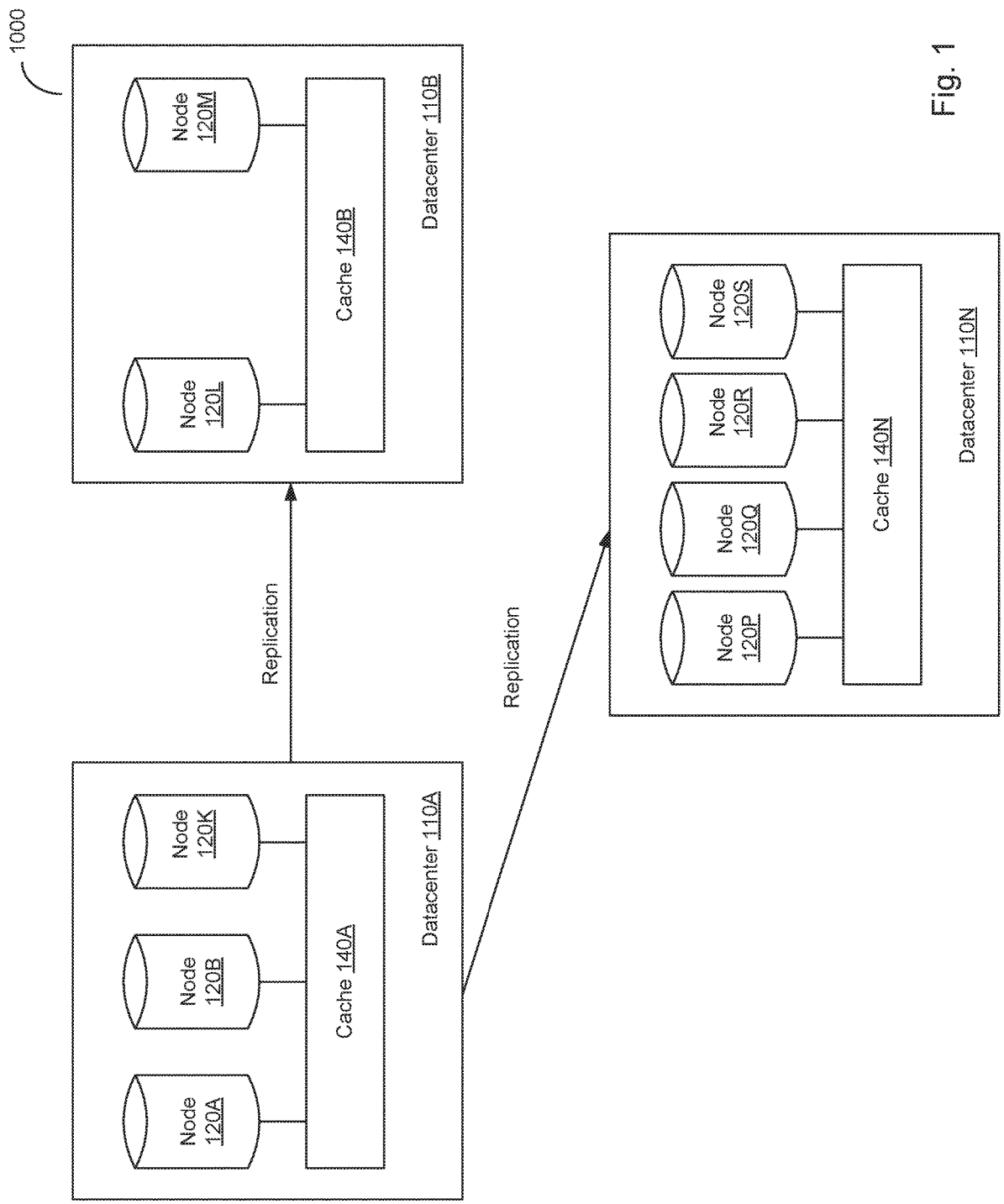
FIG. 1 schematically illustrates a high-level diagram of an example distributed database operating in accordance with one or more aspects of the present disclosure.

FIG. 1 schematically illustrates a high-level diagram of an example distributed database operating in accordance with one or more aspects of the present disclosure. Computing devices, appliances, and network segments are shown in FIG. 1 for illustrative purposes only and do not in any way limit the scope of the present disclosure. Various other computing devices, components, and appliances not shown in FIG. 1, and/or methods of their interconnection may be compatible with the methods and systems for low latency cache synchronization in distributed databases described herein. Various functional or auxiliary network components (e.g., firewalls, load balancers, network switches, user directories, content repositories, etc.) may be omitted from FIG. 1 for clarity.

In the illustrative example of FIG. 1, the distributed database 1000 resides in multiple datacenters 110A-110N interconnected by one or more networks 115, such that each datacenter 110 hosts a plurality of nodes 120, which collectively store the contents of a respective instance of the distributed database and the local cache 140. The datacenters 110A-110N may be geographically distributed in order in order to increase the overall throughput and reduce the network-related latency in servicing the client requests, e.g., by redirecting each request to a datacenter which is located in a geographic proximity to the request-originating client.

In certain implementations, each instance of the distributed database may be horizontally or vertically partitioned. Horizontal partitioning involves splitting the database records between multiple storage nodes 120 based on, e.g., a primary key. Vertical partitioning involves splitting the database tables by columns, such that each database record would be distributed over multiple storage nodes 120. Accordingly, each database access request may be routed to one or more storage nodes that store the corresponding database partition ("shard").

Figure 2:
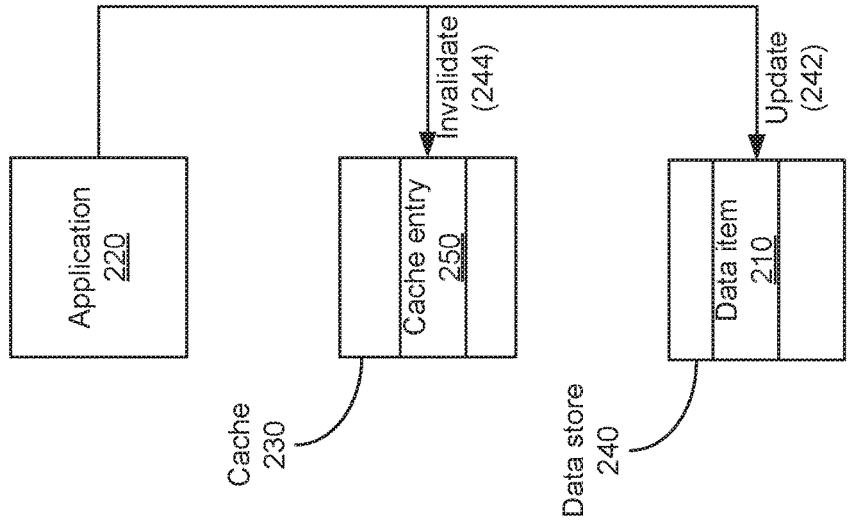
FIG. 2 schematically illustrates an example cache aside strategy which may be implemented by a distributed database operating in accordance with one or more aspects of the present disclosure.
Figure 2:
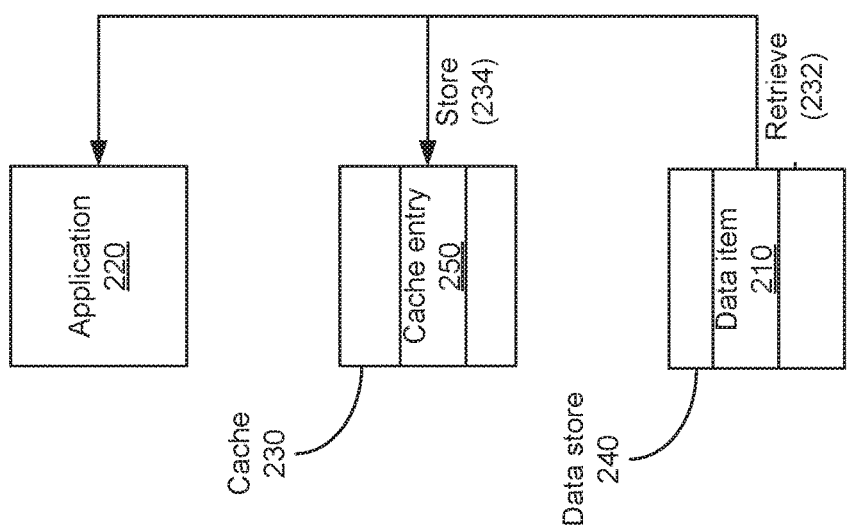

The distributed database 1000 may implement various cache coherence protocols and strategies. In an illustrative example, the cache aside strategy may be implemented, as schematically illustrated by FIG. 2. The data is loaded to the cache on demand: if a data item 210 requested by an application 220 is not found in the cache 230, it is retrieved (operation 232) from the data store 240 and stored in the cache as a new cache entry 250 (operation 234). If the data item 210 is subsequently updated (operation 242) by the application 220, it is then stored in the data store 240, and the corresponding cache entry 250 is invalidated (operation 244). In the distributed scenario, each datacenter maintains its own local cache, and thus the cache coherence strategy should further implement cache synchronization, such that a cache entry invalidation caused by a database access operation performed in one datacenter would be propagated to other datacenters which may store the cache entry that has been invalidated. In order to prevent the possibility of stale data being read from the cache, the cache update latency (i.e., the time elapsed between the data update operation and the cache been fully synchronized) should be minimized.

Figure 3:
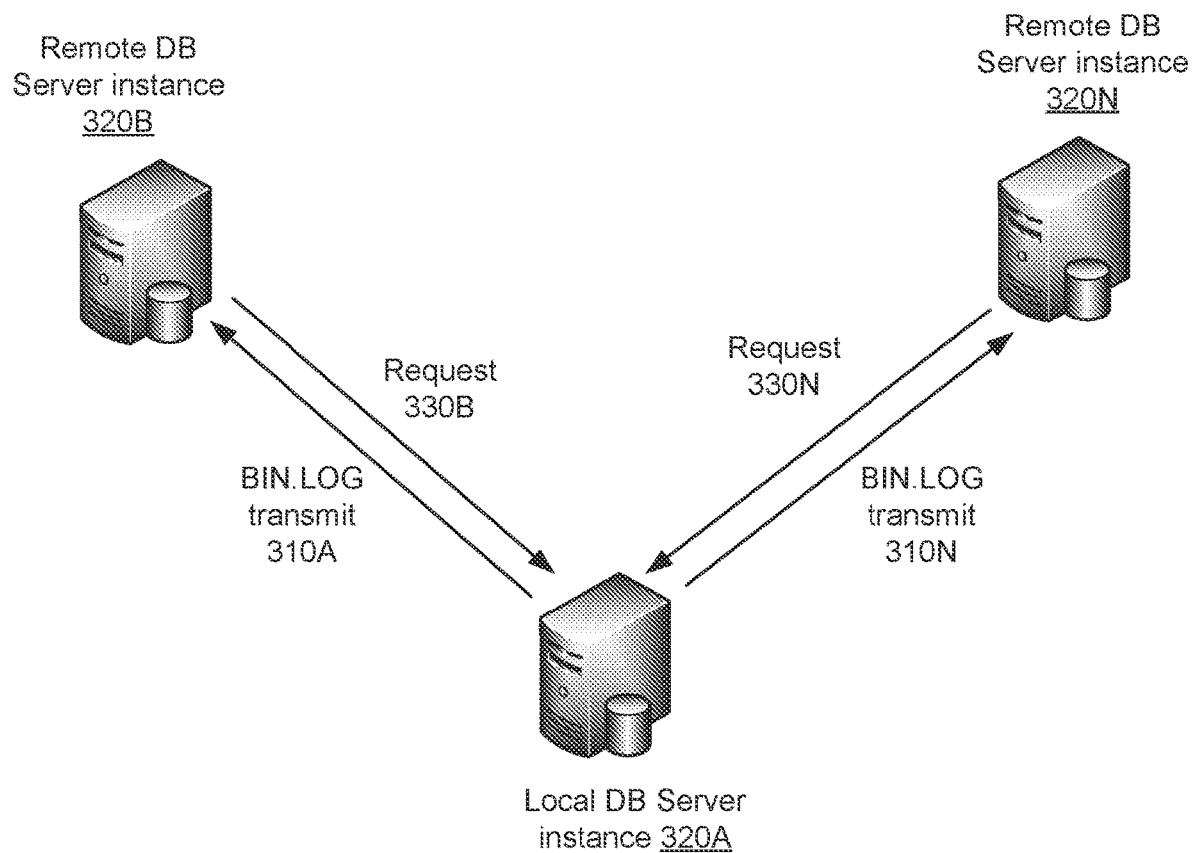
FIG. 3 schematically illustrates transaction log transmission operations performed by a database instance operating in accordance with one or more aspects of the present disclosure.

A database update transaction may be initiated on any database instance and may involve performing one or more database update operations (such as table creation operations or changes to table data). The database update operations are reflected by the local transaction log which records all events that modify database structure or contents from the moment the local database instance was started. The transaction log may be utilized for replication, e.g., by the local database instance (i.e., the instance that has performed a database update transaction) sending the transaction log to the remote datacenters for updating the respective database instances. In certain implementations, as schematically illustrated by FIG. 3, transmission (operation 310) of the transaction log to one or more remote database instances 320B-320N may be performed by the local database instance 320A responsive to receiving requests 330 from the remote database instances 320B-320N (i.e., the remote database instances pulling the transaction log from the local database instance).

At each remote datacenter, the remote database instance may replay the transaction log, thus executing the database update operations to make the same data changes that have been previously made on the transaction-originating database instance (e.g., database tables are created or their structure modified, data is inserted, deleted, and/or updated, thus mirroring the changes that were originally performed on the local database instance).

Figure 4:
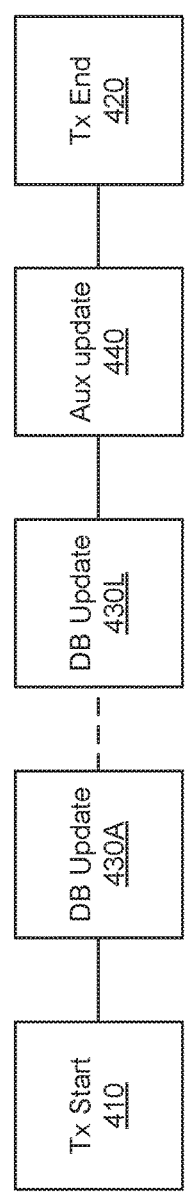
FIG. 4 schematically illustrates an example database update transaction performed by a database instance operating in accordance with one or more aspects of the present disclosure.

As schematically illustrated by FIG. 4, a database update transaction 400 (delimited by transaction start 410 and transaction end 420 markers) may include one or more database update operations 430A-430L (such as table creation operations or changes to table data). Since the cache aside strategy involves invalidating a cache entry that is employed to store a data item which has been updated in the data store, at least some of the database update operations 430A-430L may involve invalidating one or more cache entries, such that each cache entry may store one or more data items that have been modified by the database update operations. In accordance with one or more aspects of the present disclosure, an auxiliary update operation 440 may be further performed within the scope of the database update transaction, to insert identifiers of the invalidated cache entries into a predetermined database table that is specifically employed for storing invalidated cache entry identifiers. In certain implementations, the predetermined database table may be created in a simulated storage engine (e.g., the "black hole" storage engine). A table residing in the "black hole" storage engine accepts inserted data but does not persistently store it, such that retrievals would always return an empty result set.

If the database logging is enabled, the database update operations 430A-430L and 440 will be reflected by the transaction log. Upon committing the transaction locally (or upon receiving a request from a remote datacenter), the local database instance may transmit, to one or more remote datacenters, the transaction log reflecting the database update operations that have been performed within the scope of the committed transaction.

Upon receiving the transaction log reflecting the database update operations 430A-430L and 440, a replication agent running on a remote database instance would locally replay the database update operations 430A-430L and 440. The replayed operations will be reflected by the local commit log. The replication agent may then parse the local commit log and invalidate the cache entries whose identifiers are specified by transaction log entries reflecting insertion of identifiers of the invalidated cache entries into the predetermined database table employed for storing invalidated cache entry identifiers, thus synchronizing the local cache with the database contents.

Figure 5:
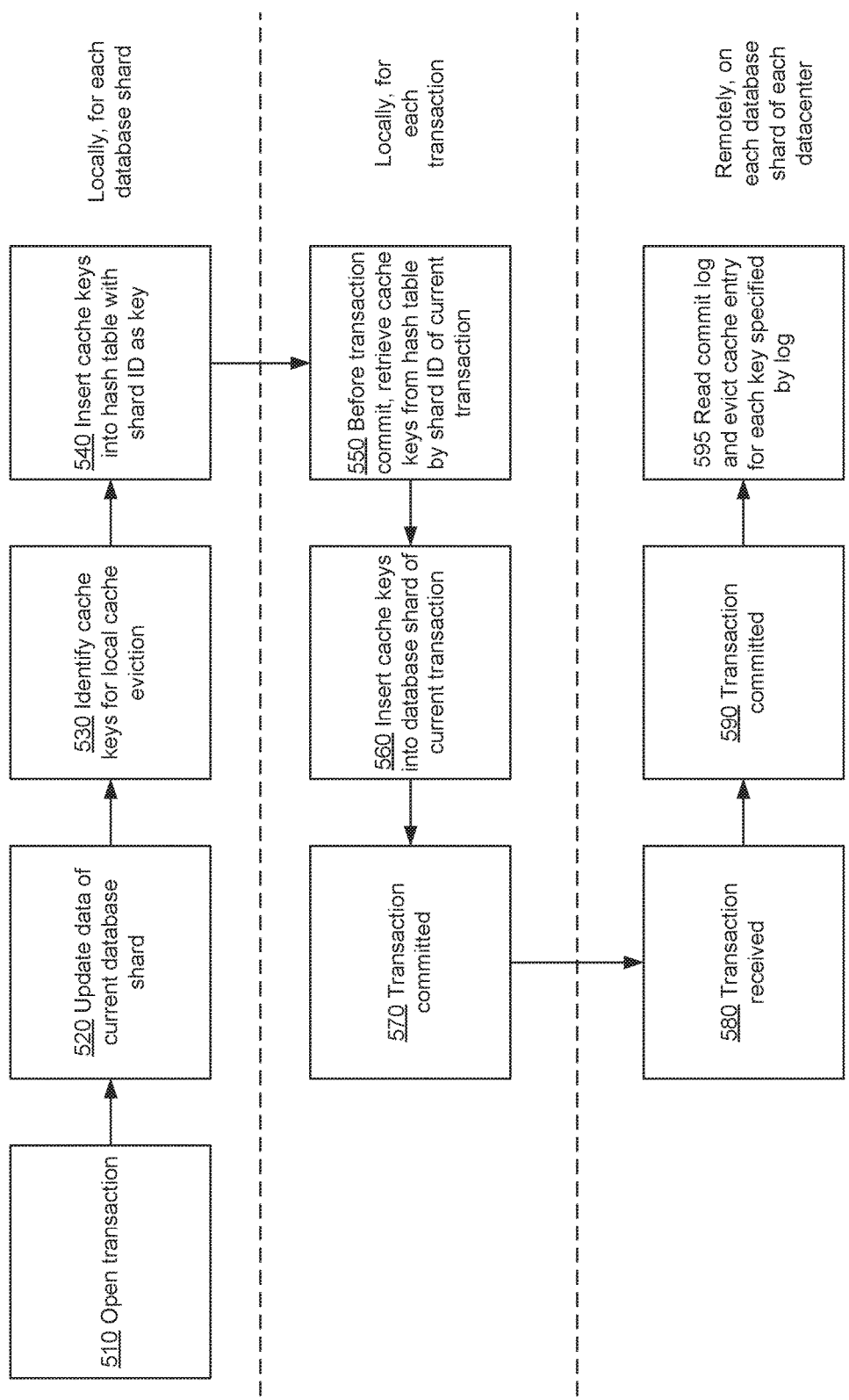
FIG. 5 depicts an example workflow of low latency cache synchronization in distributed databases, in accordance with one or more aspects of the present disclosure.

FIG. 5 depicts an example workflow of low latency cache synchronization in distributed databases, in accordance with one or more aspects of the present disclosure. Workflow 500 and/or each of its individual functions, routines, subroutines, or operations may be performed by one or more processors of a database instance (referred to as "the local database instance") of a distributed database. In certain implementations, workflow 500 may be performed by a single processing thread. Alternatively, workflow 500 may be performed by two or more processing threads, each thread executing one or more individual functions, routines, subroutines, or operations of the workflow. In an illustrative example, the processing threads implementing workflow 500 may be synchronized (e.g., using semaphores, critical sections, and/or other thread synchronization mechanisms). Alternatively, the processing threads implementing workflow 500 may be executed asynchronously with respect to each other. Therefore, while FIG. 5 and the associated description lists the operations of workflow 500 in certain order, various implementations of the workflow may perform at least some of the described operations in parallel and/or in arbitrary selected orders.

As schematically illustrated by FIG. 5, a database update transaction may be initiated by a transaction start operation 510. The database update transaction may include one or more database update operations 520 in which database tables are created or their structure modified, data is inserted, deleted, and/or updated.

As noted herein above, the cache aside strategy involves invalidating a cache entry that is employed to store a data item which has been updated in the data store. Thus, at least some of the database update operations 520 may involve invalidating one or more cache entries, whose identifiers (e.g., cache entry keys) are determined at operation 530. The identified cache keys may be stored (operation 540) in a memory data structure (e.g., a hash table).

As schematically illustrated by FIG. 6, the hash table 600 may be indexed by the shard identifier (i.e., the shard identifier is used as the key 610 of the hash table, and the cache entry identifier represents the value 620 corresponding to the key).

Referring again to FIG. 5, operations 520-540 are performed for each database shard of the database instance that has initiated the transaction 510.

In order to reflect the cache invalidation in the local transaction log, an auxiliary update operation 560 may be further performed within the scope of the database update transaction, to insert identifiers of the invalidated cache entries into a predetermined database table that is specifically employed for storing invalidated cache entry identifiers. These cache entry identifiers are retrieved (operation 550), by shard identifier, from the hash table. Upon completing the auxiliary update operation 560, the transaction is committed (operation 570) by the local database instance. Operations 550-570 are performed by the local database instance for each transaction.

As noted herein above, the database update operations 520 and 560 are reflected by the local transaction log which records all events that modify database structure or contents. The local database instance then transmits the transaction log to the remote datacenters for updating the respective database instances.

Operations 580-595 are performed by each remote datacenter. Upon receiving the transaction log (operation 580) from the local database instance, a replication agent running on the remote database instance replays the database update operations 520 and 560 and commits the transaction (operation 590).

The replayed operations will be reflected by the commit log. The replication agent running on the remote database may then parse the commit log and invalidate the cache entries whose identifiers are specified by the transaction log entries reflecting insertion of identifiers of the invalidated cache entries into the predetermined database table (operation 595), thus synchronizing the local cache with the database contents. Operations 580-595 are performed by each remote database instance.

Figure 7:
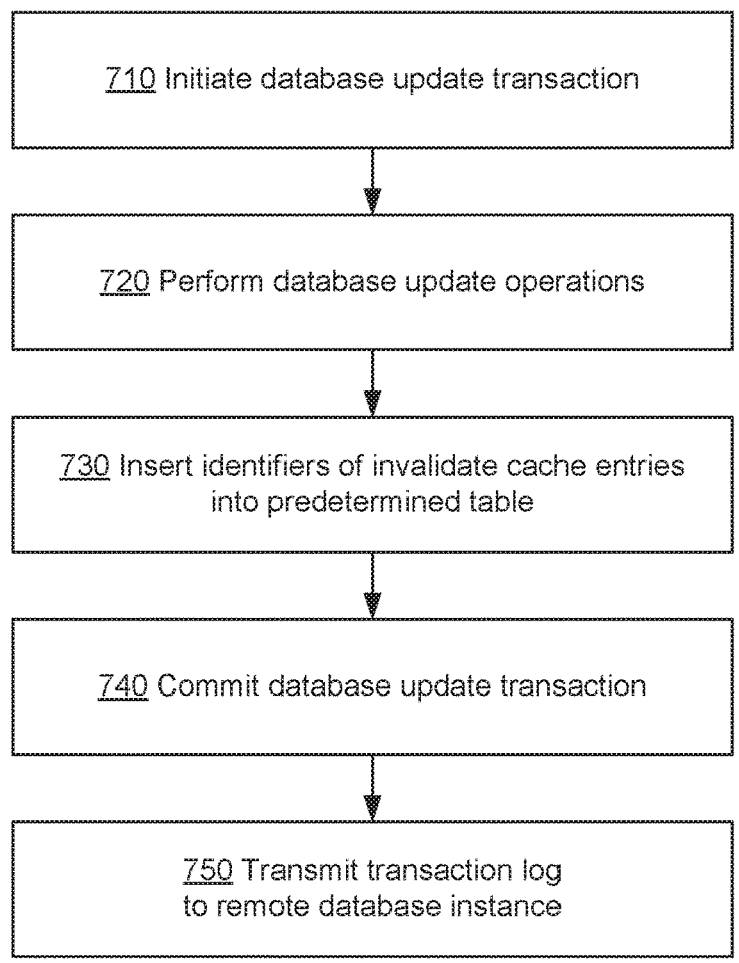
FIG. 7 depicts a flowchart of an example method of low latency cache synchronization in distributed databases performed by a database instance initiating a database update transaction, in accordance with one or more aspects of the present disclosure.

FIG. 7 depicts a flowchart of an example method 700 of low latency cache synchronization in distributed databases performed by a database instance initiating a database update transaction, in accordance with one or more aspects of the present disclosure. Method 700 and/or each of its individual functions, routines, subroutines, or operations may be performed by one or more processors of a computing system performing the method (e.g., the database instance 320A of FIG. 3). In certain implementations, method 700 may be performed by a single processing thread. Alternatively, method 700 may be performed by two or more processing threads, each thread executing one or more individual functions, routines, subroutines, or operations of the method. In an illustrative example, the processing threads implementing method 700 may be synchronized (e.g., using semaphores, critical sections, and/or other thread synchronization mechanisms). Alternatively, the processing threads implementing method 700 may be executed asynchronously with respect to each other. Therefore, while FIG. 7 and the associated description lists the operations of method 700 in certain order, various implementations of the method may perform at least some of the described operations in parallel and/or in arbitrary selected orders.

At block 710, a computing system executing the method may initiate a database update transaction.

At block 720, the computing system may perform, within the scope of the database update transaction, one or more database update operations (e.g., a table creation operation or changes to table data). The database update operations will be reflected by the local transaction log, as described in more detail herein above.

At block 730, the computing system may perform, within the scope of the database update transaction, one or more auxiliary database update operations to insert, into a predetermined table of the distributed database, identifiers of cache entries that have been invalidated by the database update operations of block 720. In an illustrative example, the predetermined table may be implemented by a simulated storage engine without persistently storing the data which is inserted into the predetermined table. The auxiliary database update operations will also be reflected by the transaction log, as described in more detail herein above.

At block 740, the computing system may commit the database update transaction, as described in more detail herein above.

At block 750, the computing system may transmit the local transaction log to one or more remote instances of the distributed database. In an illustrative example, transmitting the transaction log to a remote instance may be performed responsive to receiving a transaction log request from the remote instance, as described in more detail herein above. Upon completing the operations of block 750, the method may terminate.

Figure 8:
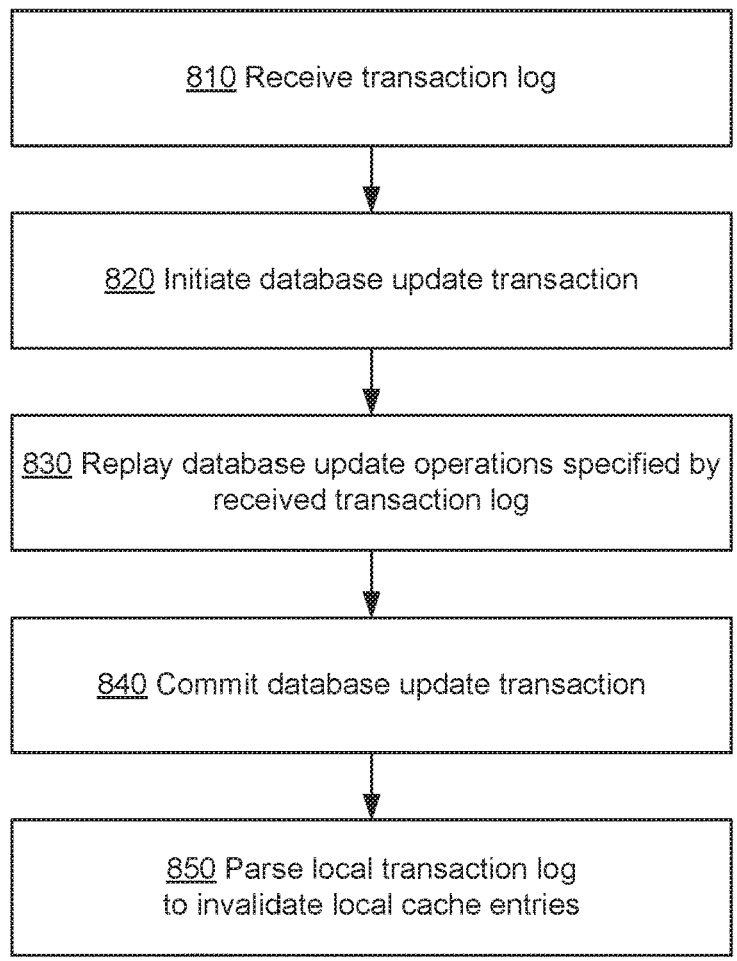
FIG. 8 depicts a flowchart of an example method of low latency cache synchronization in distributed databases performed by a database instance receiving a transaction log from another database instance that has performed a database update transaction, in accordance with one or more aspects of the present disclosure.

FIG. 8 depicts a flowchart of an example method of low latency cache synchronization in distributed databases performed by a database instance receiving a transaction log from another database instance that has performed a database update transaction, in accordance with one or more aspects of the present disclosure. Method 800 and/or each of its individual functions, routines, subroutines, or operations may be performed by one or more processors of a computing system performing the method (e.g., the database instance 320B-320N of FIG. 3). In certain implementations, method 800 may be performed by a single processing thread. Alternatively, method 800 may be performed by two or more processing threads, each thread executing one or more individual functions, routines, subroutines, or operations of the method. In an illustrative example, the processing threads implementing method 800 may be synchronized (e.g., using semaphores, critical sections, and/or other thread synchronization mechanisms). Alternatively, the processing threads implementing method 800 may be executed asynchronously with respect to each other. Therefore, while FIG. 8 and the associated description lists the operations of method 800 in certain order, various implementations of the method may perform at least some of the described operations in parallel and/or in arbitrary selected orders.

At block 810, a computing system executing the method may receive, from a database instance that has performed a database update transaction, a transaction log reflecting the database update transaction. The database update transaction may include one or more database update operations (e.g., a table creation operation or changes to table data) and one or more auxiliary database update operations to insert identifiers of the invalidated cache entries into a predetermined table of the distributed database, as described in more detail herein above.

At block 820, the computing system may initiate a database update transaction.

At block 830, the computing system may replay the transaction log by locally performing the database update operations and auxiliary database update operations reflected by the received transaction log. The replayed operations will be reflected by the local commit log, as described in more detail herein above.

At block 840, the computing system may commit the database update transaction.

At block 850, the computing system may parse the local commit log and invalidate, in the local cache, the cache entries whose identifiers are specified by commit log entries reflecting insertion of identifiers of the invalidated cache entries into the predetermined database table, thus synchronizing the local cache with the database contents, as described in more detail herein above.

Upon completing the operations of block 850, the method may terminate.

Figure 9:
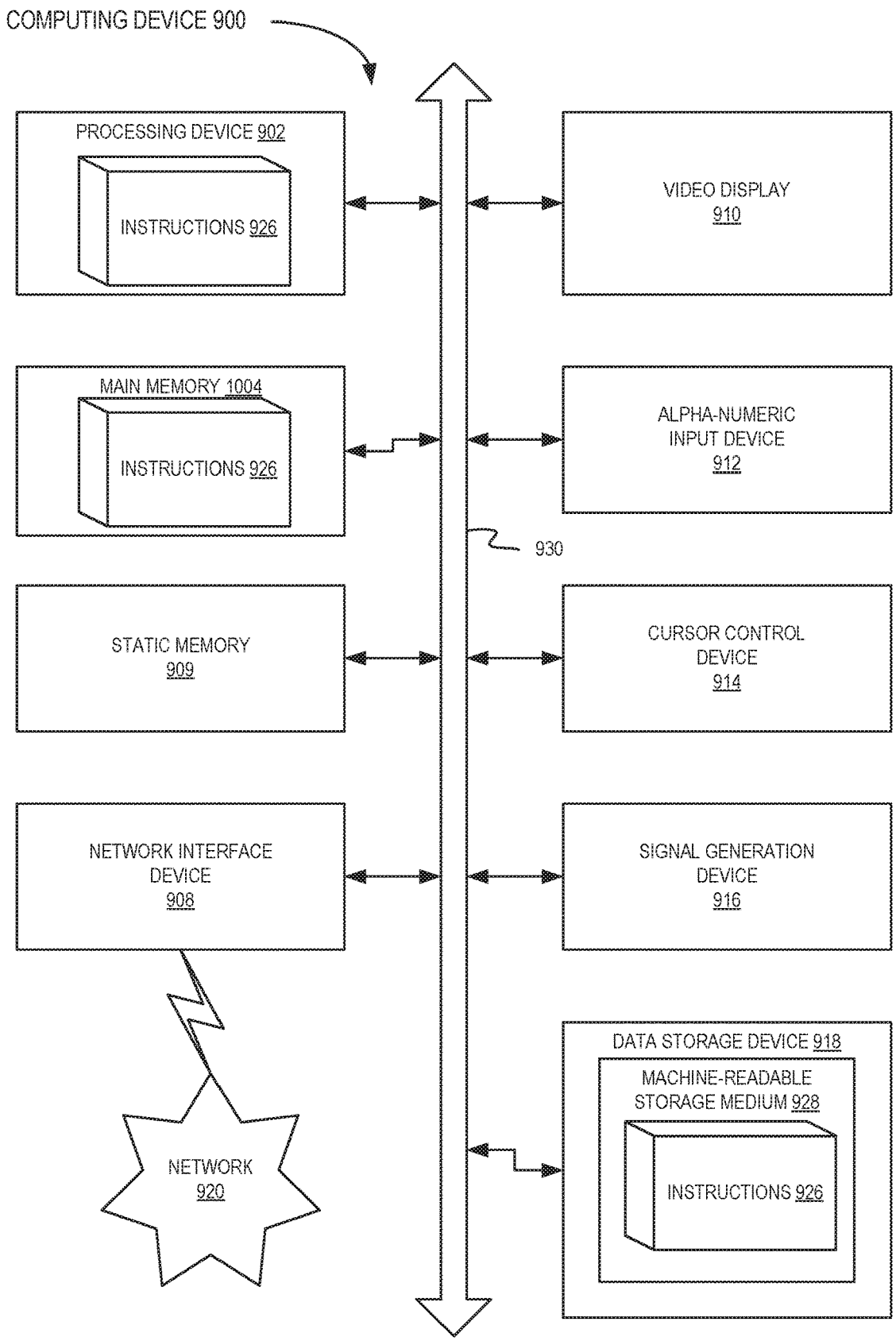
FIG. 9 schematically illustrates a diagrammatic representation of an example computing device which may implement the systems and methods described herein.

FIG. 9 schematically illustrates a diagrammatic representation of a computing device 900 which may implement the systems and methods described herein. In various illustrative examples, computing device may implement various components of FIGS. 1-3, including database servers, storage nodes, application servers, etc.

Computing device 900 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 900 may include a processing device (e.g., a general purpose processor) 902, a main memory 904 (e.g., synchronous dynamic random access memory (DRAM), read-only memory (ROM)), a static memory 909 (e.g., flash memory and a data storage device 918), which may communicate with each other via a bus 930.

Processing device 902 may be provided by one or more general-purpose processing devices such as a microprocessor, central processing unit, or the like. In an illustrative example, processing device 902 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 902 may also comprise one or more special-purpose processing devices such as an application specific integrated circuit (ASIC), a field programmable gate array (FPGA), a digital signal processor (DSP), network processor, or the like. The processing device 902 may be configured to execute module 926 implementing methods 600 and/or 700 of low latency cache synchronization in distributed databases, in accordance with one or more aspects of the present disclosure, for performing the operations and steps discussed herein.

Computing device 900 may further include a network interface device 909 which may communicate with a network 920. The computing device 900 also may include a video display unit 99 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In one embodiment, video display unit 99, alphanumeric input device 912, and cursor control device 914 may be combined into a single component or device (e.g., an LCD touch screen).

Data storage device 918 may include a computer-readable storage medium 928 on which may be stored one or more sets of instructions, e.g., instructions of module 926 implementing methods 600 and/or 700 of low latency cache synchronization in distributed databases. Instructions implementing module 926 may also reside, completely or at least partially, within main memory 904 and/or within processing device 902 during execution thereof by computing device 900, main memory 904 and processing device 902 also constituting computer-readable media. The instructions may further be transmitted or received over a network 920 via network interface device 909.

While computer-readable storage medium 928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
 performing, by a first instance of a distributed database, within a scope of a database update transaction, a first database update operation modifying a data item stored by the distributed database, wherein the first database update operation is reflected by a transaction log maintained by the first instance of the distributed database, and wherein the first instance of the distributed database resides in a first data center located at a first geographic location;
 invalidating, in a database cache associated with the first instance of the distributed database, a cache entry storing a copy of the data item;
 performing, within the scope of the database update transaction, a second database update operation to insert an identifier of the cache entry into a predetermined table of the distributed database, wherein the second database update operation is reflected by the transaction log;
 committing the database update transaction by the first instance of the distributed database; and
 transmitting the transaction log to a second instance of the distributed database, wherein the second instance of the distributed database resides in a second data center located at a second geographic location.

2. The method of claim 1, wherein the predetermined table is implemented by a simulated storage engine without persistently storing data inserted into the predetermined table.

3. The method of claim 1, wherein the database cache is managed according to a cache aside strategy.

4. The method of claim 1, further comprising:
 storing the identifier in the cache entry in a memory data structure indexed by a shard identifier of the first instance of the distributed database.

5. The method of claim 1, wherein the first instance of the distributed database is horizontally-sharded.

6. The method of claim 1, wherein the first instance of the distributed database is vertically-sharded.

7. The method of claim 1, wherein transmitting the transaction log to the second instance of the distributed database is performed responsive to receiving a transaction log request from the second instance of the distributed database.

8. A method, comprising:
 receiving, by a first instance of a distributed database, a transaction log reflecting a database update transaction including a first database update operation and a second database update operation performed by a second instance of the distributed database, wherein the second database update operation inserts, into a predetermined table of the distributed database, an identifier of a cache entry that has been invalidated by the second instance of the distributed database, and wherein the first instance of the distributed database resides in a first data center located at a first geographic location and the second instance of the distributed database resides in a second data center located at a second geographic location;
 performing, by parsing the transaction log, the first database update operation and the second database update operation, wherein the first database update operation and the second database update operation are reflected by a commit log;
 committing the database update transaction by the first instance of the distributed database;
 parsing the commit log to retrieve the identifier of the cache entry that has been inserted into the predetermined table;
 invalidating the cache entry in a database cache maintained by the first instance of the distributed database.

9. The method of claim 8, wherein the predetermined table is implemented by a simulated storage engine without persistently storing data inserted into the predetermined table.

10. The method of claim 8, wherein the database cache is managed according to a cache aside strategy.

11. The method of claim 8, further comprising:
 transmitting, to the second instance of the distributed database, a request for the transaction log.

12. The method of claim 8, wherein the first instance of the distributed database is horizontally-sharded.

13. The method of claim 8, wherein the first instance of the distributed database is vertically-sharded.

14. A distributed database, comprising:
 a first instance comprising a first processor and a first memory, the first memory maintaining a first database cache, wherein the first instance of the distributed database resides in a first data center located at a first geographic location; and
 a second instance comprising a second processor and a second memory, the second memory maintaining a second database cache, wherein the second instance of the distributed database resides in a second data center located at a second geographic location;
 wherein the first instance is configured to:
  responsive to performing, within a scope of a database update transaction, a first database update operation, invalidate a cache entry residing in the first database cache, wherein the first database update operation is reflected by a transaction log maintained by the first instance;
  perform, within the scope of the database update transaction, a second database update operation to insert an identifier of the cache entry into a predetermined table of the distributed database, wherein the second database update operation is reflected by the transaction log; and
  responsive to committing the database update transaction, transmit the
  transaction log to the second instance; and
 wherein the second instance is configured, responsive to receiving the transaction log, to:
  perform the first database update operation specified by the transaction log; and
  invalidate the cache entry.

15. The distributed database of claim 14, wherein the predetermined table is implemented by a simulated storage engine without persistently storing data inserted into the predetermined table.

16. The distributed database of claim 14, wherein the database cache is managed according to a cache aside strategy.

17. The distributed database of claim 14, wherein invalidating the cache entry further comprises:
  retrieving, from a commit log, a transaction log entry reflecting insertion of an identifier of the cache entry into a predetermined table of the distributed database.

* * * * *